United States Patent [19]

Popelka

[11] Patent Number: 4,641,484
[45] Date of Patent: Feb. 10, 1987

[54] HAY BALE WRAPPING MACHINE

[76] Inventor: Frank E. Popelka, 2221 Big Bend Rd., Ely, Iowa 52227

[21] Appl. No.: 752,655

[22] Filed: Jul. 8, 1985

[51] Int. Cl.⁴ .................. B65B 13/02; A01D 39/00
[52] U.S. Cl. .................................. 53/399; 53/465; 53/587; 53/211
[58] Field of Search ............. 53/211, 214, 465, 587, 53/588, 399; 414/24.5, 492, 497, 501

[56] References Cited

U.S. PATENT DOCUMENTS

| | | | |
|---|---|---|---|
| 3,514,920 | 6/1970 | Hoffler et al. | 53/214 |
| 3,897,880 | 8/1975 | Waske et al. | 214/147 R |
| 3,935,954 | 2/1976 | Woods et al. | 414/24.5 |
| 3,985,246 | 10/1976 | Seymour | 414/497 |
| 3,986,611 | 10/1976 | Dreher | 206/386 |
| 3,999,674 | 12/1976 | Meitl | 414/24.5 |
| 4,050,221 | 9/1977 | Lancaster III, et al. | 53/211 |
| 4,094,428 | 6/1978 | White et al. | 414/24.5 |
| 4,099,629 | 7/1978 | Cox | 214/1 HH |
| 4,166,589 | 9/1979 | Hoover et al. | 242/75.4 |
| 4,173,112 | 11/1979 | Meiners | 56/341 |
| 4,243,132 | 1/1981 | Miyakoshi et al. | 193/40 |
| 4,268,210 | 5/1981 | Ferguson et al. | 414/497 |
| 4,282,700 | 8/1981 | Goldstein | 53/588 |
| 4,296,595 | 10/1981 | Meiners | 56/341 |
| 4,299,076 | 11/1981 | Humphrey | 53/587 |
| 4,325,666 | 4/1982 | Chain et al. | 414/24.5 |

Primary Examiner—John Sipos
Assistant Examiner—Donald R. Studebaker
Attorney, Agent, or Firm—Simmons, Perrine, Albright & Ellwood

[57] ABSTRACT

A machine for wrapping large cylindrical hay bales features a horizontal table for supporting a bale on one of its ends. The table is rotated while sheet wrapping material is fed from an adjacent roll and wound around the bale. Means are provided for getting an unwrapped bale from the ground onto the table and then back to the ground after wrapping.

12 Claims, 4 Drawing Figures

HAY BALE WRAPPING MACHINE

BACKGROUND OF THE INVENTION

The dominant practice nowadays is to bale hay in large cylindrical rolls, instead of small rectangular bales, the hay being bound by several circumscribing lengths of twine or similar cord. Balers pick up the hay, roll it up tightly, bind it, and then discharge it back onto the ground. Typically, whether left there or moved elsewhere, the bales always reside on their peripheral side, not on their ends. The tight binding of the hay on the periphery of the bales is supposed to protect them from deterioration when left out in the weather. But that is usually not the case, especially when the bales are left exposed for any length of time, as over the winter.

To protect the bales over long periods of exposure, large "tubes" of plastic sheet material are marketed. Each bale is raised by fork lifts stuck into one end and a "tube" manually slipped over its periphery. These "tubes", however, are expensive, do not always protect the bales sufficiently, and are difficult to apply. Another approach is embodied in devices designed to wrap the bales with plastic sheet material fed from a roll as the bale is revolved about a horizontal axis. See, for example, U.S. Pat. Nos. 4,173,112 and 4,296,595. Often these devices are incorporated into the balers themselves. But balers so equipped have proved troublesome in practice, often imperfectly wrapping the bales, breaking the sheet material, and the like. Since the wrapping mechanism is housed within the baler, breaks in the material, imperfectly wrapped bales, and so forth, are not easily or quickly corrected. Even in instances in which such devices are separate machines, apart from the balers, problems persist. Picking up a bale in the field, holding it while it is rotated about a horizontal axis and wrapped, has, so far as known, not been successfully accomplished from a practical standpoint. Hence, the chief object of the present invention is an improved bale wrapping machine in which the wrapping material is fed from a roll while the bale is rotated.

SUMMARY OF THE INVENTION

The bale wrapper of the invention is a separate machine whose components are mounted on a wheeled frame for towing behind a tractor. Instead of trying to wrap a bale while it is held and rotated about a horizontal axis, the bale is disposed with one end on a large circular bale wrapping table supported on the frame and driven for rotation about a vertical axis from the tractor. That is the most significant aspect of the invention and it results in a successful and reliable machine, in contrast to the other machines referred to above. Some sort of handling means, of course, is necessary to get a bale from the ground onto the wrapping table and then after wrapping back to the ground. There are various ways in which that can be done. The bale handling means included in the machine of the invention, which have proved satisfactory in practice, consists of two parts. The first is in effect a kind of "scoop" at the rear of the machine. A pair of spaced arms, transversely pivoted at their inner ends to the back of the frame and operated by a hydraulic ram connected into the tractor's hydraulic system, are lowered and the machine moved rearwardly. A bale on the ground is engaged by the arms on its under peripheral side, the arms then raised to a vertical position, and the bale spilled onto the table so that it sits upright on one of its ends. Adjacent the table a roll of plastic sheet wrapping material is mounted on a vertical spindle including a brake or drag for the roll. The free end of the wrap is then tucked beneath several of the twine binders and the table rotated once or twice depending upon the number of layers of wrap desired. The wrap is then cut off and the bale end pressed against the surface of the wrapped bale to secure it, the wrap used being preferably of the self-adhering type. The other part of the bale handling means consists of a roller on one end of a lever, also hydraulically operated, which engages the side of the wrapped bale opposite the bale handling arms and unloads the bale from the table by tilting the same onto the bale handling arms, maintaining it there as the bale is lowered to the ground. The machine is then driven forward to disengage the handling arms from the bale.

The entire procedure, from first engaging the bale to redepositing the wrapped bale on the ground, takes about three minutes. Since the machine is relatively simple, there is really nothing to get out of order, and the wrap material is much cheaper then the "tubes" currently used as well as being more protective and easier to apply. Conceivably, some mechanism could be devised whereby the wrap could be automatically held to the bale before it is rotated and then automatically severed from the roll after the bale is wrapped. But this is the particular aspect of the bale wrapping machines mentioned above that is so troublesome. Performing these operations manually, as in the present machine, is quick and foolproof, leaving little to go amiss. Other features and advantages of the invention will become apparent from the drawings and the more detailed description which follows.

DETAILED DESCRIPTION OF THE PREFERRED EMBODIMENT

Figure 1:
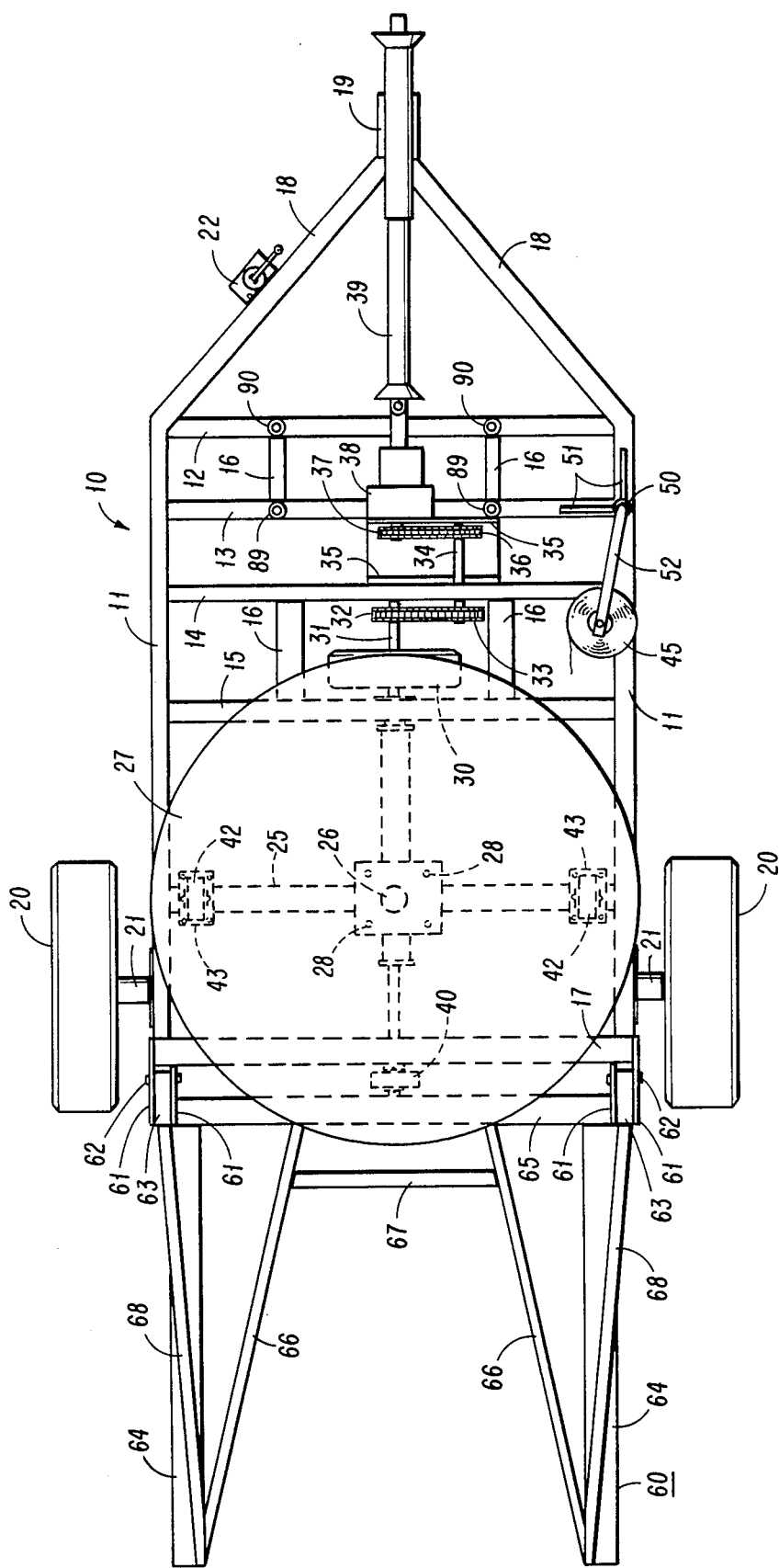
FIG. 1 is a top plan view of a bale wrapping machine according to the invention, the bale unloading part of the bale handling means being omitted for the sake of clarity.

The bale wrapping machine is carried on a ladder frame, generally indicated at 10, including channel side rails 11 laterally connected by four forward channel cross-beams 12, 13, 14 and 15, braced by four short interconnecting beams 16, and a box section cross-beam 17 atop the rear end portions of the side rails 11. The forward ends 18 of the side rails 11 are triangulated and fitted with a suitable hitch 19 for towing the machine on rubber-tired wheels 20 journaled at 21 adjacent the rear of the frame 10. A screw jack 22 is fixed to one of the side rail ends 18 to support the forward end of the machine when unhitched from a towing tractor or the like. Between the cross-beams 15 and 17 a length of square tubing is welded to the side faces of the rails 11 to the middle of which is secured the lower end of a vertical bearing 26. The upper end of the latter supports a large circular bale wrapping table 27 of steel plate bolted at 28 to the upper end of the bearing 26. The table 27 is rotated by a rubber-tired wheel 30 which engages the undersurface of the of the table 27 adjacent its forward edge. The wheel 30 is fixed to a shaft 31 appropriately journaled between the cross-beams 15 and 16. The shaft 31 carries a sprocket 32 connected by a drive chain to a sprocket 33 affixed to a shaft 34 journaled between a pair of upstanding transverse plates 35. To the shaft 34 is secured a sprocket 36 chain driven from a sprocket 37 on the output shaft of a suitable reduction gear box 38 equipped with a drive shaft 39 for attachment to a tractor's power take-off. Opposite the drive wheel 30 the table 27 is supported by a steel roller journaled on a shaft 41 from the cross-beam 25 and by similar steel rollers 42 adjacent the side rails 11. The rollers 42 are mounted atop the ends of the cross-beam 25 on brackets 43 releasably clamped thereto so that the heighth of the rollers 42 can be adjusted to provide full support for the lateral edges of the table 27.

Figure 4:
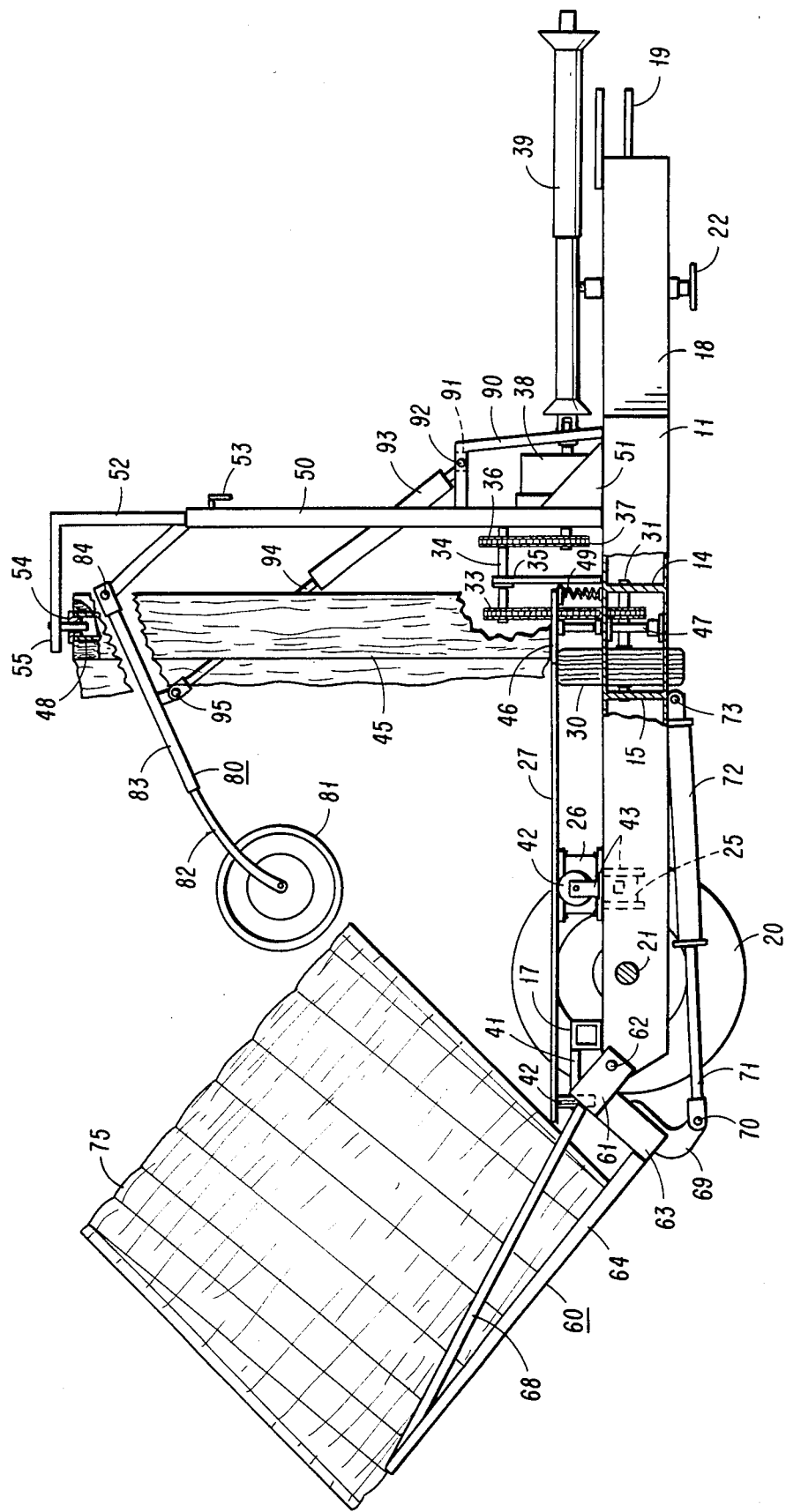
FIG. 4 is similar to FIG. 3 but showing the bale after wrapping being unloaded onto the bale handling arms.

A roll 45 of sheet wrap material is vertically mounted to one of the side rails 11 adjacent the forward edge of the table 27. The lower end of the roll 45 rests upon an end plate 46 supported by a shaft 47 journaled, as indicated in FIG. 4, in the side rail 11. The shaft 47 extends a short distance above the plate 46 and is fitted with a knob (not shown) which is received within the lower end of the arbor tube 48 of the roll 45. A spring loaded brake or drag 49 engages the underside of the plate 46. Adjacent the roll 45 an upstanding tubular column 50 is fixed to the side rail 11 and braced by triangular plates 51. A cranked arm 52 is slidably received in the column 50 and vertically adjusted by a clamp 53, the horizontal end of the arm 52 being fitted with a plug 54 fitting within the upper end of the arbor tube 48 and journaled on a short pintle 55. The roll 45 of sheet wrap is thus vertically supported for rotation and can be replaced simply by loosening the clamp 53, raising the arm 52 and swinging it to one side.

The first part of the bale handling means, generally indicated at 60, includes two pairs of short hinge plates 61 straddling the rear ends of the side rails 11 and pivoted thereto at 62. A pair of short, box section hinge arms 63 are welded between the respective pairs of the hinge plates 61 and angled generally rearwardly therefrom. To the inner faces of the hinge arms 63 and at right angles thereto are welded the forward ends of a pair of bale arms 64, also of box section, the hinge arms 63 and the forward ends of the bale arms 64 being welded in turn to a cross-beam 65. The bale arms 64 are braced by a pair of canted struts 66 welded to the outer ends of the arms 64 and to the cross-beam 65, the struts 66 being interconnected by a cross-member 67. A similar pair of struts 68 are also welded to the forward ends of the hinge arms 63 and the outer ends of the bale arms 64. To the mid-point of the cross-beam 65 is welded a depending lever arm 69 to which is pivoted at 70 the outer end of the piston rod 71 of a hydraulic ram 72 pivoted at its other end at 73 to the lower face of the frame cross-beam 15.

Figure 3:
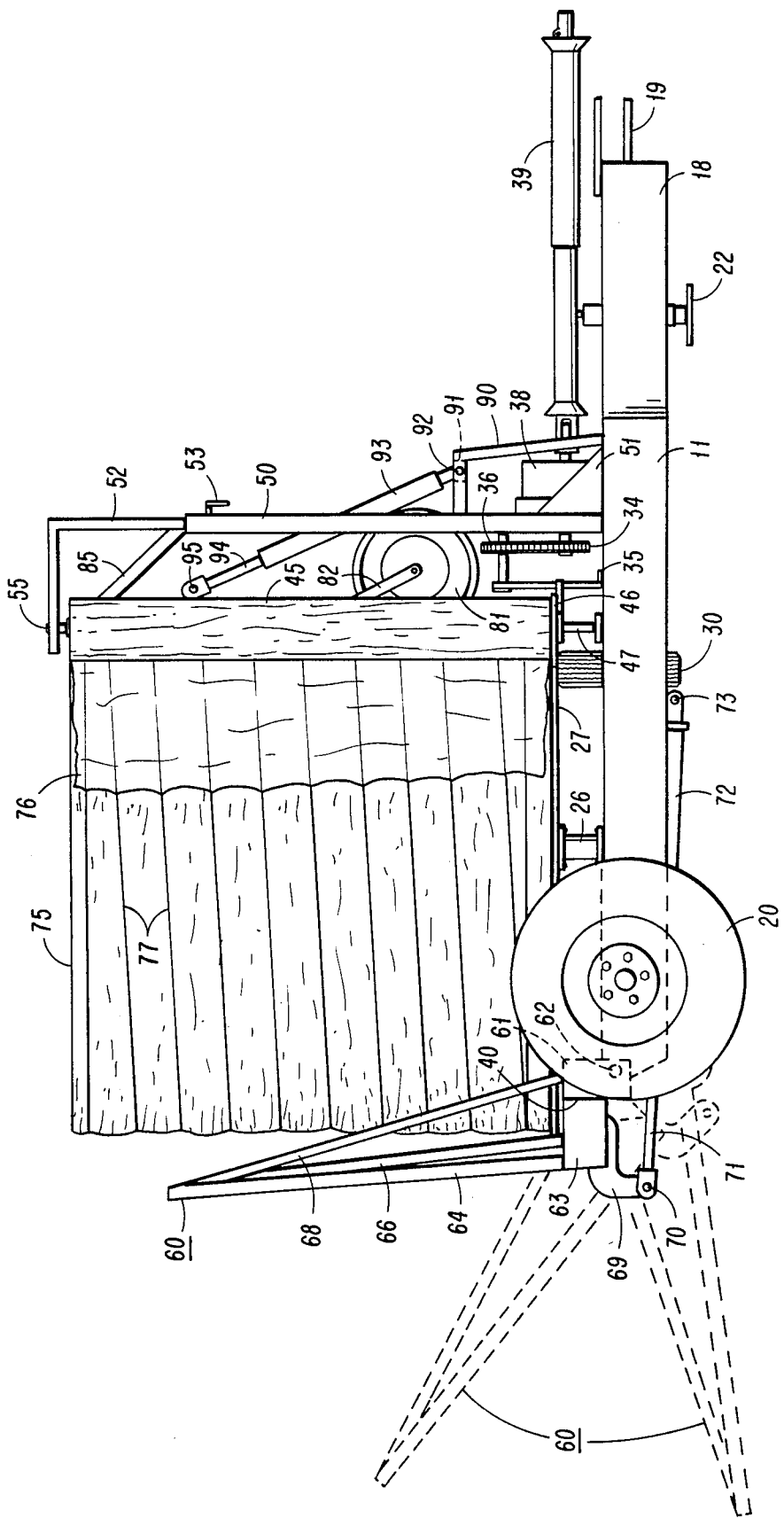
FIG. 3 is a side elevation of the machine shown with a bale in position on the wrapping table.

The ram 72, of course, is connected into the towing tractor's hydraulic system. Hence when the bale handler 60 is thereby moved to its lowermost position, as indicated in FIG. 3, and the machine moved rearwardly, the bale arms 64 can engage the under peripheral side of a bale 75 on the ground. The ram 72 is then activated whereby the bale arms 64 will elevate the bale 75 and deposit it on one end on the wrapping table 27, as further indicated in FIG. 3. The free end 76 of the bale wrap from the roll 45 is then tucked in several of the twine binders 77. Power is applied to the drive shaft 39, thus rotating the drive wheel 30 and so the table 27.

The number of turns depend of course upon the number of layers of wrap desired. The table 27 is then halted and the wrapped bale cut off from the roll 45 with a knife. A suitable plastic bale wrap is that manufactured by Mobil Corporation. It is a transparent, stretchtype wrap, 1 mil in thickness, and is available in 4,500 foot rolls, 60 inches wide, each roll weighing about 110 pounds. Since the wrap is self-adhering, the cut end can simply be pressed against the surface of the wrapped bale and so secured in that manner.

Figure 2:
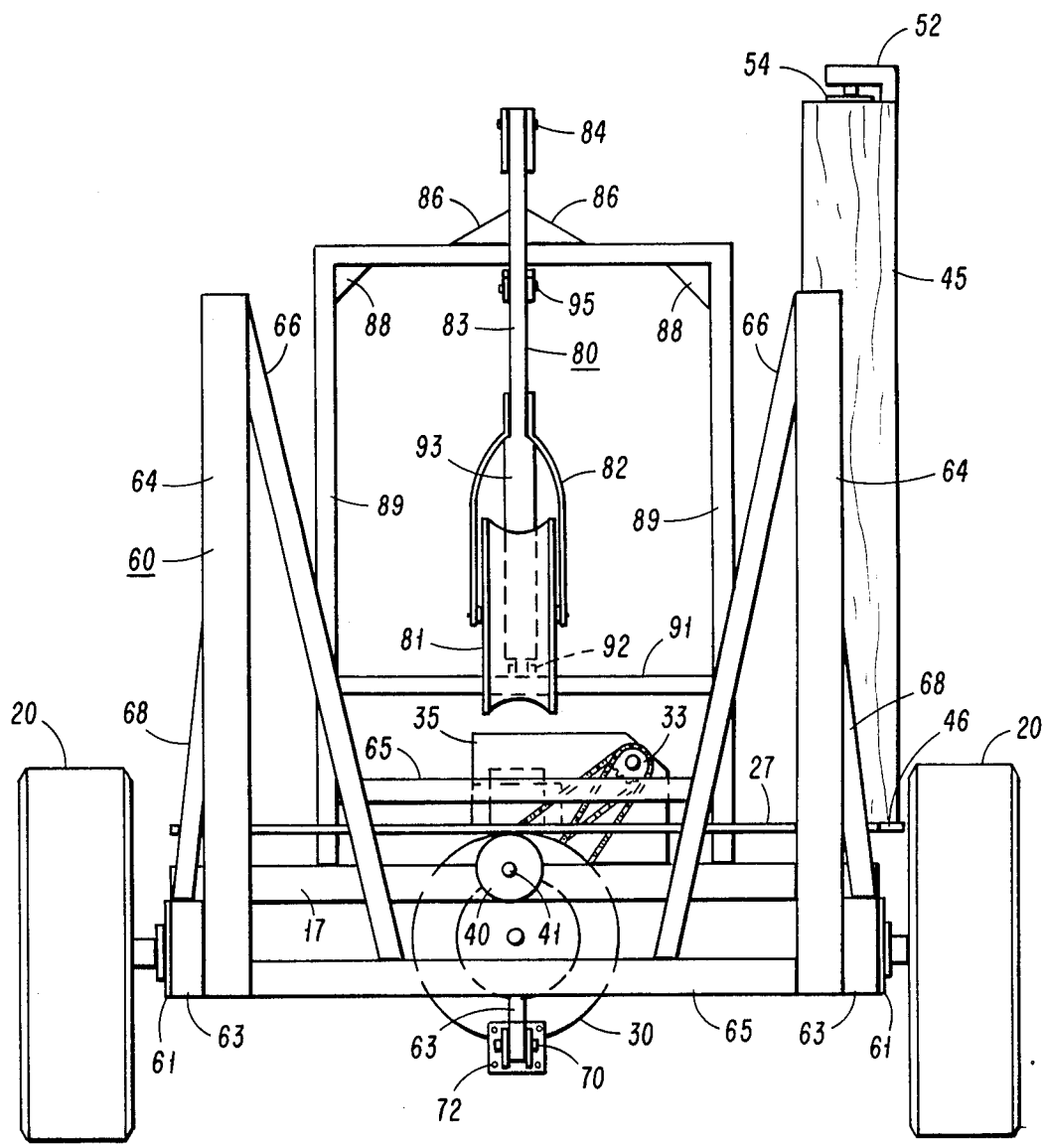
FIG. 2 is a rear elevation of the machine of FIG. 1.

The wrapped bale is then engaged by the other part of the bale handling means, namely, a bale unloader generally indicated at 80. This, as previously noted, consists of a large roller 81 journaled between a yoke 82 mounted on one end of a swinging arm 83 on the diametrically opposite side of the wrapping table 27 from the bale handler 60. The other end of the arm 83 is pivoted at 84 to one end of an inclined arm 85 whose other end is fixed at 86 atop an elevated cross-member 87 secured at 88 to the upper ends of a pair of vertical standards 89 atop the frame cross-beam 13. The standards 89 in turn are steadied by a pair of cranked braces 90 between the former and the frame cross-beam 12 (see FIGS. 1, 2 and 4). The elbows of the brace 88 are interconnected by a cross-member 91 to the midpoint of which is pivoted at 92 the cylinder of a hydraulic ram 93 whose piston rod 94 is pivoted at 95 in turn to the swinging arm 83 intermediate its ends. Accordingly, when the ram 93, which is also connected into the tractor's hydraulic system, is activated, the arm 93 will move the roller 81 into engagement with the wrapped bale 75 and tilt it onto the bale arms 64, maintaining it there as the bale handler 60 is lowered to the ground, all as indicated in FIG. 4. Then the machine is moved forward to disengage the bale arms 64 from the wrapped bale, leaving it once again on the ground on its peripheral side. Other aspects of the machine will be apparent to those of skill in the art.

Though the present invention has been described in terms of a particular embodiment, it is not limited to that embodiment alone. Instead the following claims are to be read as encompassing all adaptations and modifications of the invention falling within its spirit and scope.

I claim:

1. A machine for wrapping the periphery of large cylindrical hay bales comprising:
   (a) a supporting, generally horizontal frame having forward and rearward ends;
   (b) means supporting the frame for travel over the ground;
   (c) transport means adjacent the forward end of the frame for moving the frame over the ground;
   (d) a generally horizontal bale wrapping table carried by the frame adjacent its rearward end and mounted for rotation about a generally vertical axis;
   (e) first powered means for selectively rotating the table;
   (f) bale wrap mounting means carried by the machine and disposed adjacent the table for supporting a cylindrical roll of sheet material for rotation about a generally vertical axis;
   (g) bale handling means carried by the machine for engaging a bale lying on its peripheral side on the ground and disposing one end of the same on the bale wrapping table for rotation therewith, the bale handling means after wrapping of the bale thereupon redisposing the wrapped bale back onto the ground on its peripheral side; and (h) second powered means for selectively operating the bale handling means.

2. The machine of claim 1 wherein the transport means includes means for towing the machine.

3. The machine of claim 2 wherein the powered means include means disposed for operative attachment to power means external of the machine.

4. The machine of claim 1 wherein the bale handling means is disposed adjacent the rearward end of the machine and is movable between lower and upper positions, the bale handling means when in its lower position being effective to engage a bale lying on the ground on its peripheral side upon rearward movement of the machine, the bale handling means when moved to its upper position being effective to elevate the bale and dispose one end of same on the wrapping table.

5. The machine of claim 4 wherein the bale handling means includes scoop means having opposite ends, one end being pivoted about a transverse axis at the rearward end of the frame, the other end of the scoop means being effective when in a lower position adjacent the ground to engage the under peripheral side of a bale on the ground upon rearward movement of the machine, the second powered means being effective to move the scoop means about said pivot between its lower position and an upper substantially vertical position adjacent the bale wrapping table effective to deposit one end of the bale thereon.

6. The machine of claim 5 wherein the scoop means comprise laterally spaced arms, the second powered means including a hydraulic ram.

7. The machine of claim 5 wherein the bale handling means also includes bale unloading means for moving a bale on the wrapping table after its wrapping into engagement with the scoop means and to lower the bale to the ground when the scoop means is moved to its lower position, and third powered means for selectively operating the bale unloading means.

8. The machine of claim 7 wherein the bale unloading means includes bale tilting means disposed adjacent the bale wrapping table substantially diametrically opposite the scoop means, the bale tilting means being effective to engage the peripheral side of a bale disposed on the bale wrapping table, actuation of the third powered means being effective to tilt the bale onto the scoop means, actuation of the second powered means being effective to move the scoop means with the bale thereon to its lower position, forward movement of the machine being effective to disengage the scoop means from the bale.

9. The machine of claim 8 wherein the bale tilting means includes an arm pivoted at one end relative to the frame, the other end of the arm having roller means thereon engageable with the peripheral side of a bale, the third powered means including a hydraulic ram.

10. A method of wrapping a large cylindrical hay bale disposed upon the ground, the bale having a pair of opposite ends and a cylindrical peripheral surface therebetween having an axis, the method comprising:

(a) lifting the bale from the ground;
(b) positioning the lifted bale so that said axis is substantially vertical;
(c) fixing one transverse end of a length of sheet material relative to the bale so that said material end extends substantially across said bale surface between said bale ends;
(d) rotating the bale about said axis while feeding the sheet material onto said bale surface so that the same is wrapped around with the sheet material; and
(e) securing a second end of the sheet material to the bale.

11. The method of claim 10 wherein the sheet material is fed from a cylindrical roll thereof having an axis disposed substantially vertically, the roll being positioned alongside the bale during said rotation thereof, and including detaching the sheet material from the roll after said wrapping thereof in order to provide said second end of the sheet material.

12. The method of claim 11 wherein the bale, after securing said second end of the sheet material as aforesaid, is returned to the ground disposed upon its wrapped peripheral surface.

* * * * *